(12) United States Patent
Mashimo et al.

(10) Patent No.: US 8,406,699 B2
(45) Date of Patent: Mar. 26, 2013

(54) METHOD AND APPARATUS FOR REDUCING THE LOAD OF MANAGING THE POWER SAVE STATE OF A PARTNER

(75) Inventors: Hiroshi Mashimo, Tokyo (JP); Masanori Nakahara, Chigasaki (JP); Kazutoshi Hara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 981 days.

(21) Appl. No.: 11/660,768

(22) PCT Filed: Sep. 20, 2005

(86) PCT No.: PCT/JP2005/017664
§ 371 (c)(1),
(2), (4) Date: Feb. 22, 2007

(87) PCT Pub. No.: WO2006/033443
PCT Pub. Date: Mar. 30, 2006

(65) Prior Publication Data
US 2008/0045159 A1    Feb. 21, 2008

(30) Foreign Application Priority Data
Sep. 21, 2004   (JP) ................... 2004-273133

(51) Int. Cl.
*H04B 1/00* (2006.01)
(52) U.S. Cl. .......... 455/68; 455/41.2; 370/311; 370/468
(58) Field of Classification Search ............ 455/68, 455/41.2; 370/311, 468
See application file for complete search history.

(56) References Cited

U.S. PATENT DOCUMENTS

| | | | |
|---|---|---|---|
| 6,842,605 B1 * | 1/2005 | Lappetelainen et al. | 455/13.4 |
| 2004/0072587 A1 | 4/2004 | Tari et al. | |
| 2004/0105401 A1 * | 6/2004 | Lee | 370/311 |
| 2004/0147223 A1 | 7/2004 | Cho | |

(Continued)

FOREIGN PATENT DOCUMENTS

| | | |
|---|---|---|
| JP | 2000-69523 | 3/2000 |
| JP | 2005-210694 | 8/2005 |

(Continued)

OTHER PUBLICATIONS

IEEE Std 802.11-1997, Information Technology—Telecommunications and Information Exchange Between Systems—Local and Metropolitan Area Networks—Specific Requirements, Part 11: Wireless LAN Medium Access Control (MAC) and Physical Layer (PHY) Specifications, 1997, pp. 130-150.

(Continued)

*Primary Examiner* — Nay A Maung
*Assistant Examiner* — Erica Fleming-Hall
(74) *Attorney, Agent, or Firm* — Fitzpatrick, Cella, Harper & Scinto

(57) ABSTRACT

In the power save mode of an IEEE 802.11 adhoc network, a packet loss occurs unless the power save state of a receiving side is detected, failing in communication. However, there is no explicit notification on joining/leaving in/from a network, and it is difficult to detect and manage the state of a partner, including the detection timing. To solve this problem, a terminal always transmits an information notification packet (ATIM packet) in a time during which all terminals can receive it, prior to data transmission regardless of the power save state of a partner. With this mechanism, the terminal also explicitly notifies the partner of a change in the power save state of the terminal.

10 Claims, 14 Drawing Sheets

U.S. PATENT DOCUMENTS

| | | | |
|---|---|---|---|
| 2005/0025092 A1* | 2/2005 | Morioka et al. | 370/328 |
| 2005/0068934 A1* | 3/2005 | Sakoda | 370/350 |
| 2005/0085279 A1* | 4/2005 | Aoki | 455/574 |
| 2005/0124345 A1* | 6/2005 | Laroia et al. | 455/437 |
| 2005/0227615 A1* | 10/2005 | Sakoda | 455/7 |
| 2006/0028984 A1* | 2/2006 | Wu et al. | 370/230 |
| 2006/0193315 A1* | 8/2006 | Sinivaara et al. | 370/389 |
| 2006/0203833 A1 | 9/2006 | Hara et al. | 370/401 |
| 2006/0212732 A1 | 9/2006 | Mashimo et al. | 713/300 |
| 2006/0234740 A1* | 10/2006 | Sakoda | 455/507 |
| 2007/0207765 A1 | 9/2007 | Nakahara et al. | 455/343.1 |
| 2007/0217332 A1 | 9/2007 | Nakahara | 340/506 |

FOREIGN PATENT DOCUMENTS

| | | |
|---|---|---|
| KR | 2002-0040439 | 5/2002 |
| KR | 20030079198 A | 10/2003 |
| RU | 97100187 | 1/1999 |
| WO | 2004-171022 | 8/2004 |

OTHER PUBLICATIONS

Korean Office Action dated Dec. 29, 2008 in Korean counterpart Application No. 10-2007-7008671.

IEEE Std 802.11-1997, "Information technology—Telecommunications and information exchange between systems—Local and metropolitan area networks—Special requirements—Part 11: Wireless LAN Medium Access Control (MAC) and Physical Layer (PHY) Specifications", Jun. 26, 1997, pp. 22, 34-37, 133-136.

Written Opinion of the International Searching Authority in corresponding International Application No. PCT/JP/2005/017664, dated Dec. 20, 2005.

Office Action, dated Feb. 3, 2009, in JP 2004-273133.

Korean Official Action dated Apr. 28, 2008 in Korean Application No. 10-2007-7008671.

Russian Official Action dated Apr. 8, 2008 in Russian Application No. 2007115076/09(016362).

\* cited by examiner

US 8,406,699 B2

METHOD AND APPARATUS FOR REDUCING THE LOAD OF MANAGING THE POWER SAVE STATE OF A PARTNER

TECHNICAL FIELD

The present invention relates to a communication apparatus and communication method which perform, e.g., adhoc communication of a wireless LAN that is defined by, e.g., IEEE 802.11.

BACKGROUND ART

Recently, with integration of wireless communication devices, wireless LANs have been installed in a printer, personal digital assistant (PDA), digital camera, and cell phone in addition to a portable personal computer (so-called notebook PC). As such a portable device becomes smaller, the capacity of a mounted battery also becomes smaller, and demands for reduction in power consumption become stronger for power used in wireless communication.

For a wireless LAN, the IEEE 802.11 specifications have conventionally defined a power save mode as a function of reducing power consumption. The basic principle is to operate a receiver before and after a timing when a beacon is predicted to be transmitted, and stop power supply to the receiver in the remaining time, thereby reducing power consumption.

In an infrastructure network, a station (STA) receives a beacon transmitted from an access point (AP). The station checks a TIM (Traffic Indication Map) contained in the received beacon, and determines whether data addressed to the station has been buffered in the AP. If the station determines that data addressed to it exists, the station keeps supplying power to a transmitter/receiver, and transmits a PS-Poll packet to the AP.

Upon reception of the PS-Poll packet, the AP determines that the transmitting station is in a receivable state (Awake), and transmits buffered data to the station. Immediately after reception of the data packet, the station transmits to the AP an ACK packet which means the completion of reception.

The station checks a More Data flag contained in the MAC header of the received packet, and determines whether there is another data buffered in the AT in addition to the received packet. When a packet having a More Data flag "1" is received, the station keeps Awake. When a packet having a More Data flag "0" is received, the station stops power supply to the transmitter/receiver and shifts to a state (Doze) in which no data can be transmitted/received.

In an adhoc network, an AP which is always in the Awake state does not exist because stations directly communicate with each other. Thus, if the power save function of a communication partner is ON, the partner may be in the Awake or Doze state depending on the transmission timing, and a packet loss may be generated unless the power save (PS) state of the partner STA is detected.

Although a method of detecting the PS state of a partner is not defined in the specifications, the PS state is basically determined from a Power Management bit (PM bit) contained in the MAC header of a packet transmitted from the partner. For this purpose, the MAC address and PS state of each STA are stored and updated using a beacon transmitted from another STA which joins an adhoc network.

An example in which two stations (STA 1 and STA 2) that configure an adhoc network transmit data will be explained.

FIG. 4 is a view showing the format of a MAC header in IEEE 802.11. Values in the Frame Control field represent an example of bits of a beacon in an infrastructure network. A Pwr Mgt (PM) bit stands for Power Management, and is set by an STA. The PM bit is 1 when an STA which has transmitted the packet is in the power save state, and 0 when the STA is active. A More Data bit is used in the infrastructure network, and represents whether, when an AP transmits a data packet, data to be transmitted to the same destination has been buffered. The More Data bit is 0 when no data is buffered, and 1 when data to be subsequently transmitted has been buffered.

FIG. 11 shows timings when the PS modes of STA 1 and STA 2 are ON and STA 1 transmits data to STA 2. The axis of abscissa represents the time, and the axis of ordinate represents the current consumption level. Dose represents that current consumption is the lowest, Awake represents that a receiving unit operates and current consumption is at the intermediate level, and TX represents that current consumption is the highest in transmission. STA 1 receives a beacon (Bcn) from STA 2 before data transmission, recognizes that the PS mode of STA 2 is ON, and stores the PS-ON state of STA 2 in the memory. An ATIM Window represents a period during which all terminals in an adhoc network are in the Awake state.

Operation in FIG. 11 will be explained. When STA 1 generates data to be transmitted to STA 2 in ATIM Window 1, STA 1 refers to the memory to determine whether the PS mode of STA 2 is ON or OFF. Since the PS mode of STA 2 is ON, STA 1 transmits a beacon in ATIM Window 1, and then transmits an ATIM packet to STA 2. Since STA 2 is in the Awake state in ATIM Window 1, STA 2 successfully receives the ATIM, transmits an ACK to the ATIM-transmitting STA 1, and keeps Awake in beacon interval 1 during which the ATIM is received. Upon reception of the ACK from STA 2, STA 1 transmits a data packet to STA 2. Since STA 2 is in the Awake state, STA 2 receives the data from STA 1, and transmits an ACK to STA 1. Upon reception of the ACK, STA 1 does not have any data to be transmitted, and thus shifts to the Doze state after the end of ATIM Window 2 in the next beacon interval 2.

In an adhoc network, the probability at which STAs sequentially transmit beacons in respective beacon intervals becomes the highest. In an adhoc network having two STAs, they alternately transmit beacons in respective beacon intervals. Also in FIG. 11, STA 1 transmits a beacon in the first beacon interval 1, STA 2 transmits a beacon in the second beacon interval, and STA 1 transmits a beacon in the third beacon interval.

FIG. 12 shows timings when the PS mode of STA 1 is ON, that of STA 2 is OFF, and STA 1 transmits data to STA 2. STA 1 receives a beacon from STA 2 before data transmission, recognizes that the PS mode of STA 2 is OFF, and stores the PS-OFF state of STA 2 in the memory.

Operation in FIG. 12 will be explained. When STA 1 generates data to be transmitted to STA 2 in ATIM Window 1, STA 1 refers to the memory to determine whether the PS mode of STA 2 is ON or OFF. In FIG. 12, since the PS mode of STA 2 is OFF, STA 1 keeps Awake after the end of ATIM Window 1 and transmits a data packet to STA 2 without transmitting an ATIM packet in ATIM Window 1. Since STA 2 is always in the Awake state, it can receive data from STA 1 without receiving any ATIM, and transmits an ACK to STA 1. Upon reception of the ACK, STA 1 does not have any data to be transmitted, and thus shifts to the Doze state after the end of ATIM Window 2 in the next ATIM Window 2.

FIG. 13 shows the flow of transmitting data from STA 1 in FIGS. 11 and 12. At the start of data transmission, STA 1 confirms the power save state of a receiving side that is stored in the memory of STA 1 (S1201). If the power save mode of the receiving STA 2 is confirmed to be effective (PS mode is ON) (S1202), STA 1 determines whether it is in the ATIM Window (S1203). At the ATIM Window timing, STA 1 transmits an ATIM to STA 2 (S1204). Immediately after the ATIM is transmitted, STA 1 waits for an ACK from STA 2. If STA 1 does not receive any ACK, it determines that transmission fails, waits for the next ATIM Window timing in S1203, and retransmits an ATIM. If STA 1 receives an ACK, it waits till the timing when STA 1 exits from ATIM Window (S1206). After STA 1 exits from the ATIM Window, it transmits a data packet to STA 2 (S1207). After data transmission, STA 1 receives an ACK from STA 2. A description of an ACK to a data packet will be omitted.

If STA 1 does not have any data to be transmitted (S1208), the data transmission flow ends. If STA 1 still has data to be transmitted (S1208) and the same beacon interval continues (S1209), STA 1 transmits a data packet to STA 2 in S1207. If the same interval does not continue, the flow returns to S1201, and STA 1 executes the process from detection of the power save state of STA 2 again.

If the PS mode of the receiving STA 2 is determined in steps S1201 and S1202 to be OFF, STA 2 is always in the Awake state, and STA 1 transmits data to STA 2 after the end of the ATIM Window without transmitting any ATIM packet.

As described above, in a conventional adhoc network, the transmitting side transmits an ATIM packet and then data when the PS mode of the receiving side is ON, and transmits data without transmitting any ATIM packet when the PS mode is OFF. In order to communicate with stations which join the adhoc network, the power save state of each station must be grasped. For this purpose, the state of a PM bit contained in a packet such as a beacon transmitted from each station must be detected. To store a detection result for each MAC address and update it every packet reception, functions of detecting, storing, and updating a power save state are added, consuming the memory, CPU resource, and the like.

There is no explicit information representing joining/leaving in/from an adhoc network. The adhoc network assumes that a terminal joins the network when beacon transmission newly starts, and leaves from the network when no beacon is transmitted. It is therefore difficult to set the update timing of the power save state of a station.

As another problem, when the power save state of a station is updated after beacon transmission and a station which is to receive the beacon fails in reception, update of the power save state delays.

DISCLOSURE OF INVENTION

It is an object of the present invention to reduce the load of managing the power save state of a partner on a data transmitting apparatus.

It is another object of the present invention to reduce a data reception error.

According to the present invention, a communication apparatus is comprising annunciation signal transmission means for periodically transmitting an annunciation signal, control information transmission means for transmitting predetermined control information in a predetermined period after the annunciation signal transmission means transmits the annunciation signal, and data transmission means for transmitting desired data after the control information transmission means transmits the predetermined control information, wherein when the data transmission means transmits data, the control information transmission means transmits the control information regardless of a state of a destination of the data.

A communication apparatus is comprising annunciation signal transmission means for periodically transmitting an annunciation signal, control information transmission means for transmitting predetermined control information in a predetermined period after the annunciation signal transmission means transmits the annunciation signal, and data transmission means for transmitting desired data after the control information transmission means transmits the predetermined control information, wherein the control information transmission means always transmits the control information before the data transmission means transmits data.

A communication method is comprising a step of forming a network and determining a predetermined period during which a communication apparatus in a power save state is a data receivable state, and a step of, when data is to be transmitted to another communication apparatus, transmitting predetermined control information and transmitting the data in the predetermined period without identifying the power save state of another communication apparatus.

A communication method is comprising steps of determining a predetermined period during which a reception process is performed regardless of whether a communication apparatus which forms a network is in a power save state or the like, and when data is to be transmitted to another communication apparatus, always transmitting, in the predetermined period, control information for canceling the power save state of a communication apparatus which is in the power save state, without identifying the power save state of another communication apparatus.

Other features and advantages of the present invention will be apparent from the following description taken in conjunction with the accompanying drawings, in which like reference characters designate the same or similar parts throughout the figures thereof.

BEST MODE FOR CARRYING OUT THE INVENTION (First Embodiment)

Figure 1:
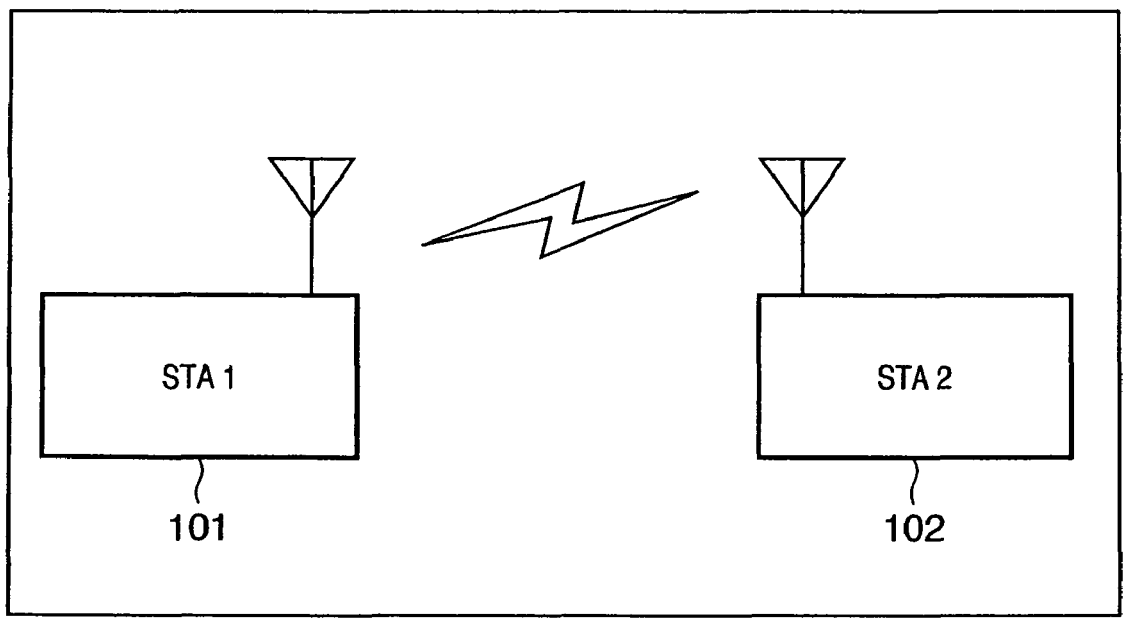
FIG. 1 is a view showing the configuration of an adhoc network according to the first to third embodiments of the present invention.

FIG. 1 shows the configuration of an adhoc network according to the first embodiment. In FIG. 1, reference numeral 101 denotes a camera; and 102, a printer. A case wherein both the camera and printer adhoc-communicate with each other without managing the power save states of the partners will be explained. The camera 101 and printer 102 periodically transmit an IEEE 802.11 beacon signal. The beacon signal in the adhoc network is transmitted between wireless devices which form an IBSS (Independent Basic Service Set). The beacon signal is an annunciation signal containing various types of IEEE 802.11 information such as an SSID (Service Set ID) serving as network identification information, beacon interval information for transmitting a beacon signal, an ATIM Window length, and information on power management.

Figure 2:
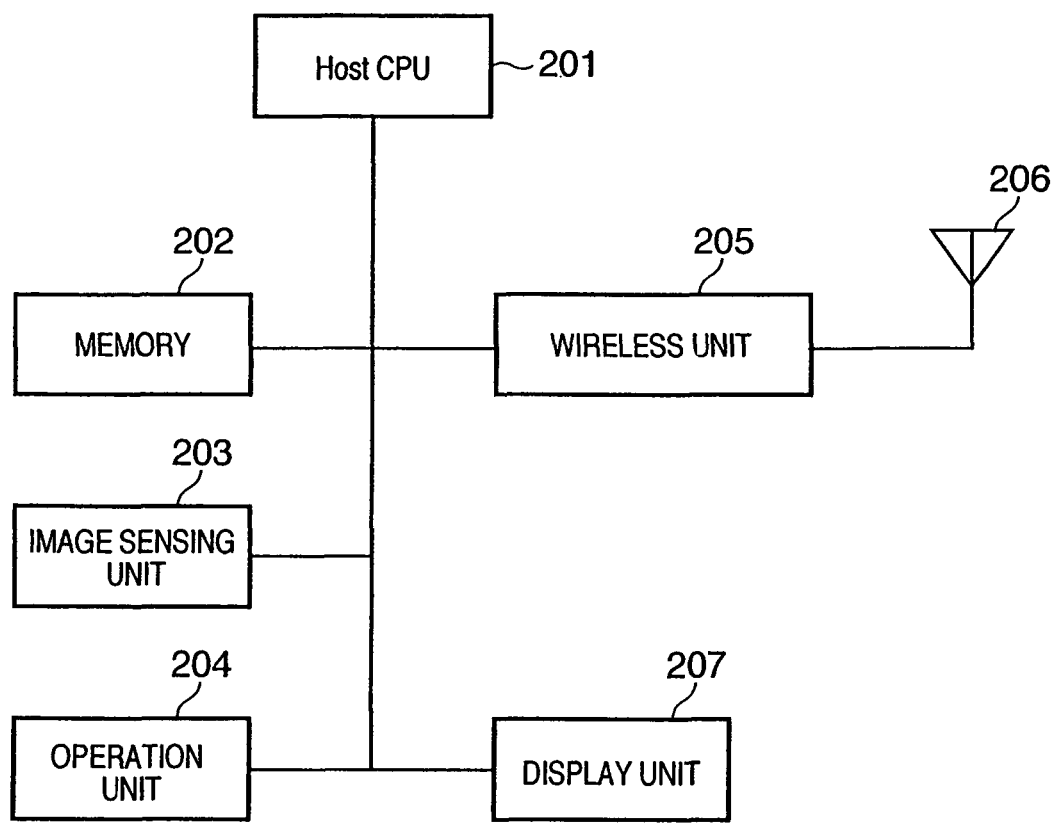
FIG. 2 is a block diagram showing the internal configuration of a camera according to the first to third embodiments of the present invention.

FIG. 2 shows the internal configuration of the camera serving as STA 1. In FIG. 2, a host CPU 201 controls the entire camera, and issues to a wireless unit 205 a power control command for the power save mode or the like. A memory 202 stores programs to be executed by the host CPU 201, and saves images sensed by an image sensing unit 203. Connection destination information (e.g., the MAC addresses of the wireless units of a PC and printer) used by the wireless unit 205 is also stored in the memory 202 in advance. The image sensing unit 203 is made up of a lens, CCD, and the like. An operation unit 204 is made up of a power button, shutter button, and other user interfaces. The wireless unit 205 comprises IEEE 802.11 wireless transmission and reception units, and includes the RF (Radio Frequency) layer which processes an analog signal, the BB (Base Band) layer which processes a digital signal, and the MAC (Media Access Control) layer which controls a medium. The wireless unit 205 has a unique power save mode corresponding to a communication status. An antenna 206 emits an RF signal generated by the wireless unit 205 to the space, and transfers radio waves received from the space as an RF signal to the wireless unit 205. A display unit 207 is formed from an image monitor for an image currently sensed by the image sensing unit 203, and a liquid crystal display capable of setting and displaying, e.g., the photographing mode and communication mode of the camera. Note that the wireless unit 205 may be implemented by incorporating it in the camera 101, or operating under the control of the host CPU 201 and a wireless communication card driver which is stored in the memory 202 upon mounting a wireless communication card onto a card interface.

Figure 3:
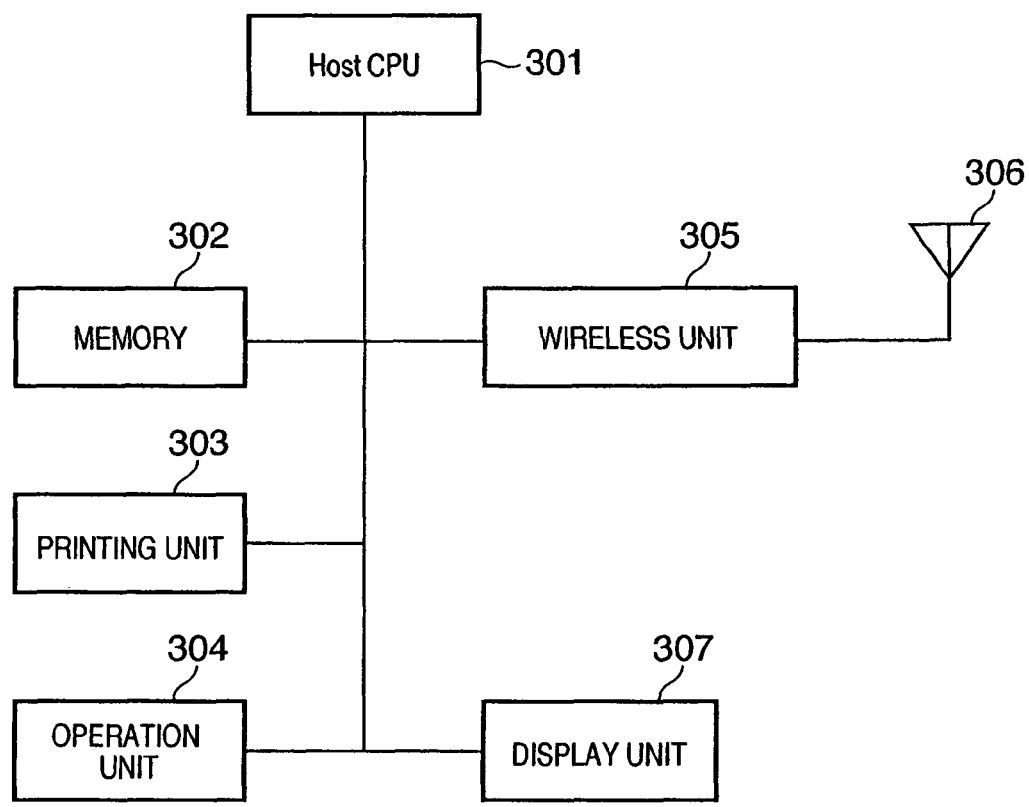
FIG. 3 is a block diagram showing the internal configuration of a printer according to the first to third embodiments of the present invention.

FIG. 3 shows the internal configuration of the printer serving as STA 2. In FIG. 3, a host CPU 301 controls the entire printer, and issues to a wireless unit 305 a power control command for the power save mode or the like. A memory 302 stores programs to be executed by the host CPU 301, temporarily stores an image file received by the wireless unit, and holds data to be printed by a printing unit 303. Connection destination information (e.g., the MAC addresses of the wireless units of a PC and camera) used by the wireless unit 305 is also stored in the memory 302 in advance. The printing unit 303 is made up of a printhead, head driving device, ink, and the like. An operation unit 304 is made up of a power button, reset button, and other user interfaces. The wireless unit 305 comprises IEEE 802.11 wireless transmission and reception units, and includes the RF layer which processes an analog signal, the base band layer which processes a digital signal, and the MAC (Media Access Control) layer which controls a medium. The wireless unit 305 has a unique power save mode corresponding to a communication status. An antenna 306 emits an RF (Radio Frequency) signal generated by the wireless unit 305 to the space, and transfers radio waves received from the space as an RF signal to the wireless unit 305. A display unit 307 is formed from an image monitor for selecting an image file to be printed by the printing unit 303, a liquid crystal display capable of setting and displaying, e.g., the printing mode and communication mode of the printer, or a simple LED. The wireless unit 305 may also be implemented by incorporating it in the printer 102, or operating under the control of the host CPU 301 and a wireless communication card driver which is stored in the memory 302 upon mounting a wireless communication card onto a card interface.

Radio packet transmission operation in the first embodiment will be explained.

Figure 5:
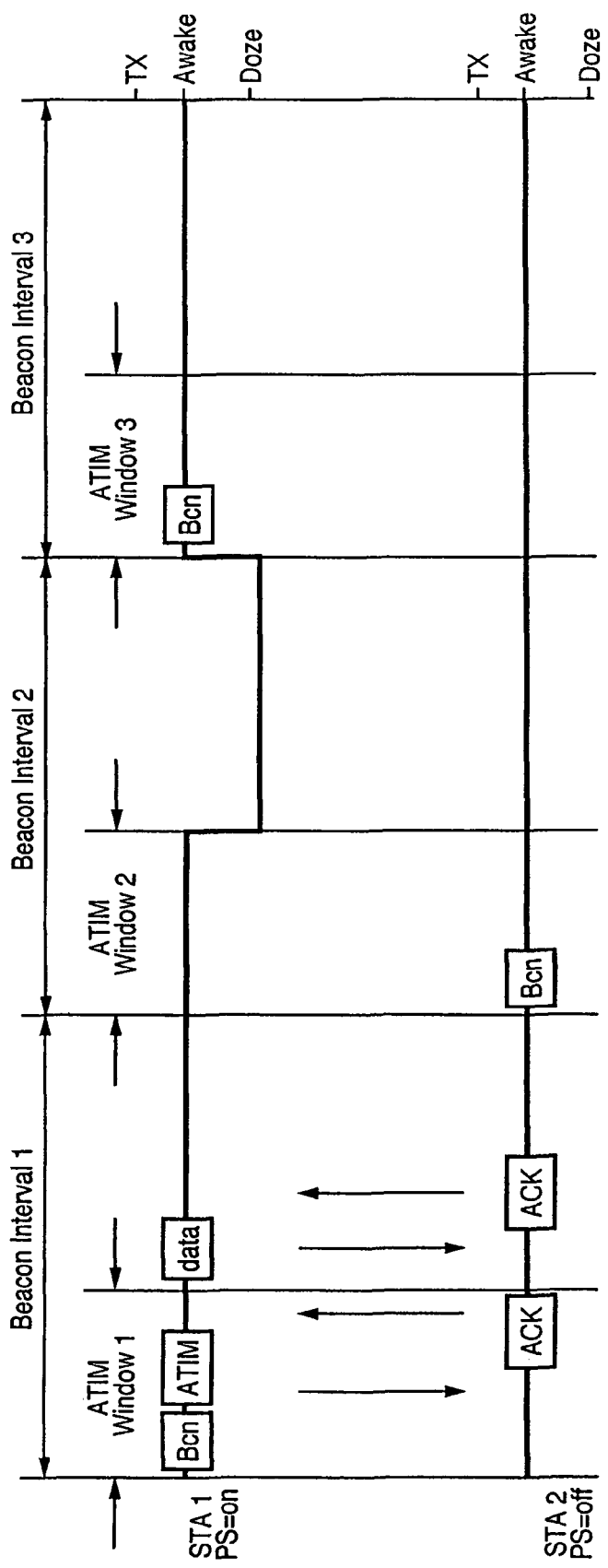
FIG. 5 is a chart showing an example of data transmission when the PS mode of a partner is OFF according to the first and second embodiments of the present invention.

Operation when the PS mode of the transmitting side is ON and that of the receiving side is OFF will be described with reference to FIG. 5. STA 1 corresponds to a camera, and STA 2 corresponds to a printer. FIG. 5 shows timings when STA 1 transmits data to STA 2. STA 1 neither detects nor stores the PS state of STA 2 even before data transmission.

When STA 1 generates data to be transmitted to STA 2 in ATIM Window 1, it transmits an ATIM packet to STA 2 after beacon transmission in ATIM Window 1 regardless of whether the PS mode of STA 2 is ON or OFF. Since STA 2 is always in the Awake state, it successfully receives the ATIM, and transmits an ACK to the ATIM-transmitting STA 1. Upon reception of the ACK from STA 2, STA 1 transmits a data packet to STA 2. Since STA 2 is always in the Awake state, it receives the data from STA 1, and transmits an ACK to STA 1. Upon reception of the ACK, STA 1 does not have any data to be transmitted, and thus shifts to the Doze state after the end of ATIM Window 2 in the next beacon interval 2.

Figure 10:
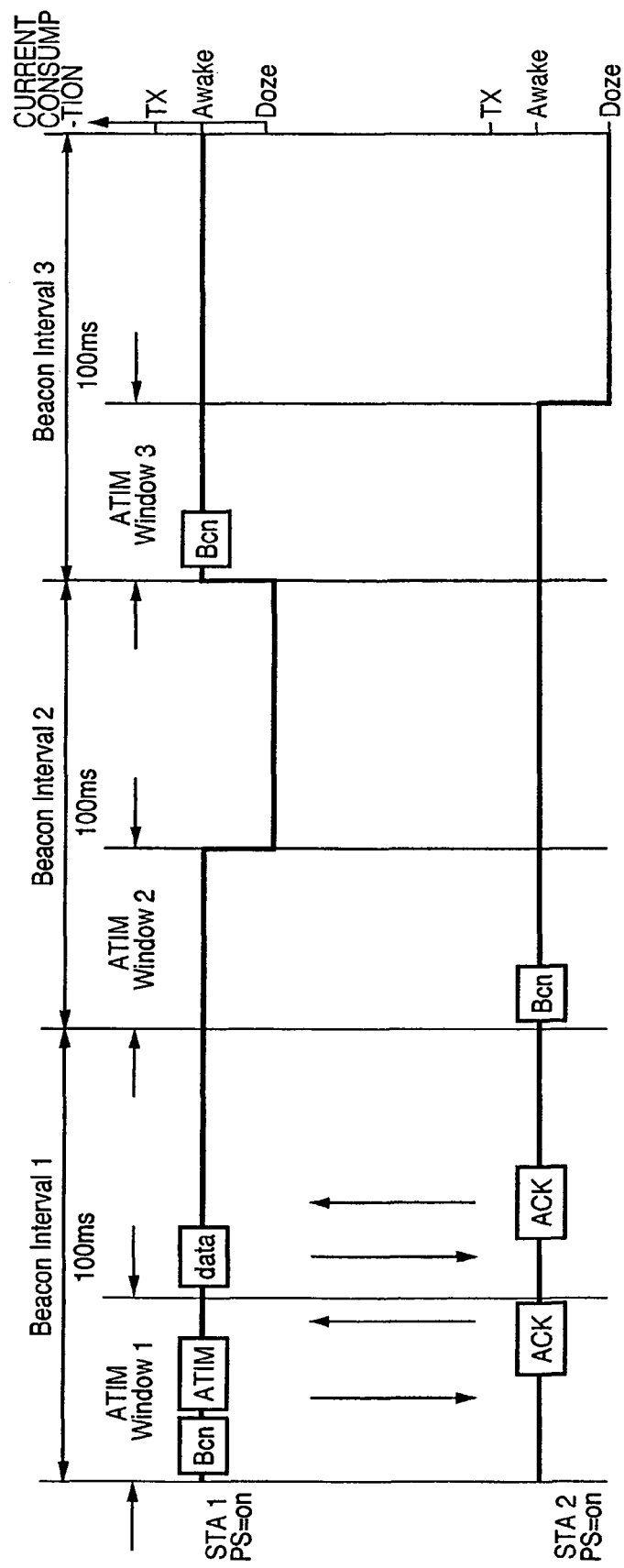
FIG. 10 is a chart showing an example of data transmission when the PS mode of a partner is ON according to the first and second embodiments of the present invention.
Figure 11:
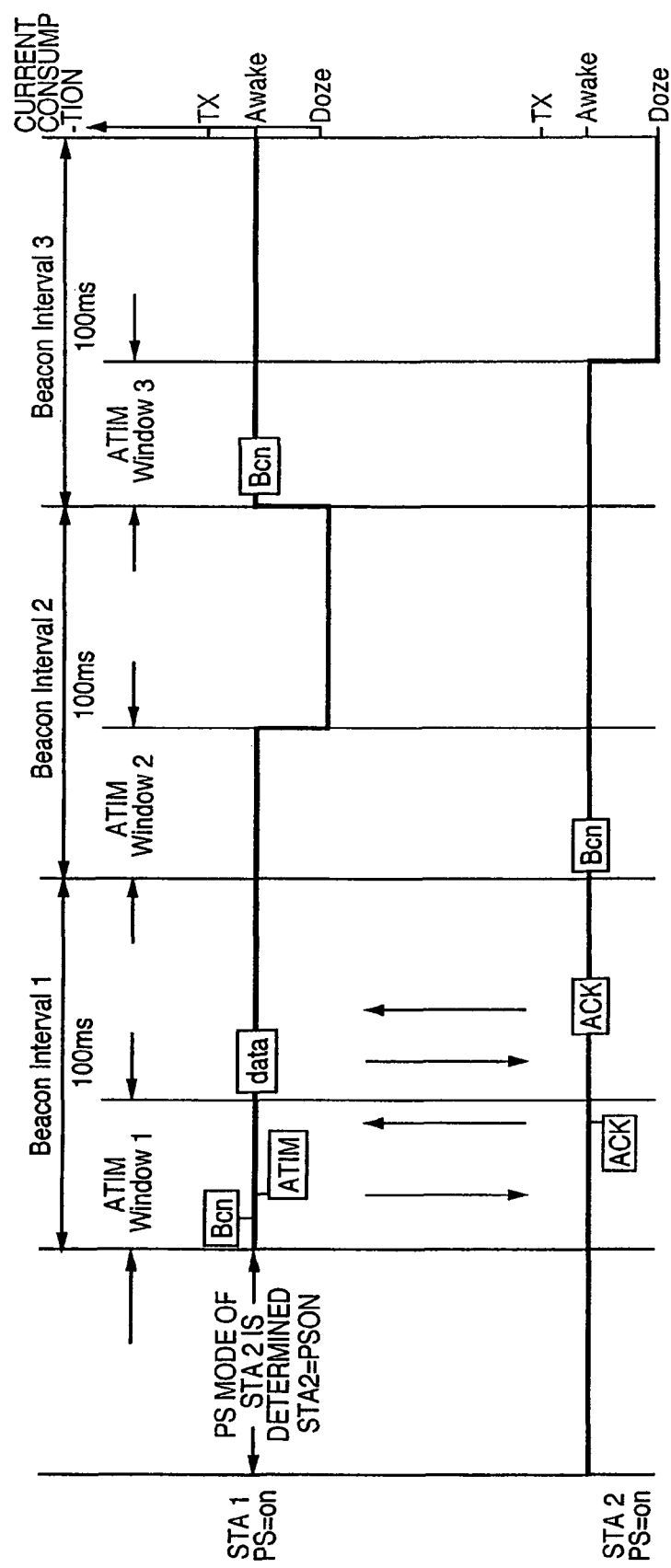
FIG. 11 is a chart showing an example of data transmission when the PS mode of a partner is ON according to the prior art.

Operation when the PS mode of the transmitting side is ON and that of the receiving side is ON will be described with reference to FIG. 10. STA 1 corresponds to a camera, and STA 2 corresponds to a printer. FIG. 10 shows timings when STA 1 transmits data to STA 2. STA 1 neither detects nor stores the PS state of STA 2 even before data transmission.

When STA 1 generates data to be transmitted to STA 2 in ATIM Window 1, it transmits an ATIM packet to STA 2 after beacon transmission in ATIM Window 1 regardless of whether the PS mode of STA 2 is ON or OFF. Since STA 2 is always in the Awake state in an ATIM Window even while the PS mode is ON, it successfully receives the ATIM, and transmits an ACK to the ATIM-transmitting STA 1. Upon reception of the ATIM packet, STA 2 keeps Awake in the beacon interval in which the ATIM packet is received. Upon reception of the ACK from STA 2, STA 1 transmits a data packet to STA 2. Since STA 2 keeps Awake, it receives the data from STA 1, and transmits an ACK to STA 1. Upon reception of the ACK, STA 1 does not have any data to be transmitted, and thus shifts to the Doze state after the end of ATIM Window 2 in the next beacon interval 2.

The operation sequence of the camera 101 when image data sensed by the camera 101 is transferred to the printer 102 and printed will be explained with reference to the flowchart of FIG. 6. Assume that the printer 102 has already started beacon transmission as the creator of an adhoc network at ATIM Window=5 ms and PM=0, and then the camera 101 starts beacon transmission as a joiner. Image data sensed by the image sensing unit 203 of the camera 101 is stored in the memory 202, and an image file which is stored in the memory 202 is selected, transferred to the printer, and designated to be printed by using the operation unit 204 and display unit 207. Upon reception of the printing instruction, the host CPU 201 starts transferring the image file to the wireless unit 205.

In order to transmit the image file to the printer 102, the wireless unit 205 of the camera 101 receives a beacon from the printer 102 via the antenna 206, and determines whether the printer 102 is in the ATIM Window period (S601). At this time, whether the PS mode of the printer 102 is ON or OFF is not determined. In the ATIM Window period, the camera 101 transmits an ATIM packet to the printer 102 (S602). If no ACK can be received from the printer 102 immediately after the ATIM packet is transmitted (S603), the flow returns to S601 to retransmit an ATIM. If an ACK is successively received in S603, the flow waits until the ATIM Window ends (S604). At the end of the ATIM Window, an image data packet is transmitted (S605). Since the image file is large in size, it is segmented into a plurality of packets, and these packets are transmitted over a plurality of beacon intervals. If data to be transmitted still remains (S606) and the same beacon interval continues (S607), the camera 101 transmits the next data packet in S605. If many data packets exist and cannot be transmitted in the same beacon interval, the flow returns to S601 to transmit an ATIM again in order to transmit data packets in the next beacon interval. If it is confirmed in S606 that no data to be transmitted remains, data transfer ends.

Figure 6:
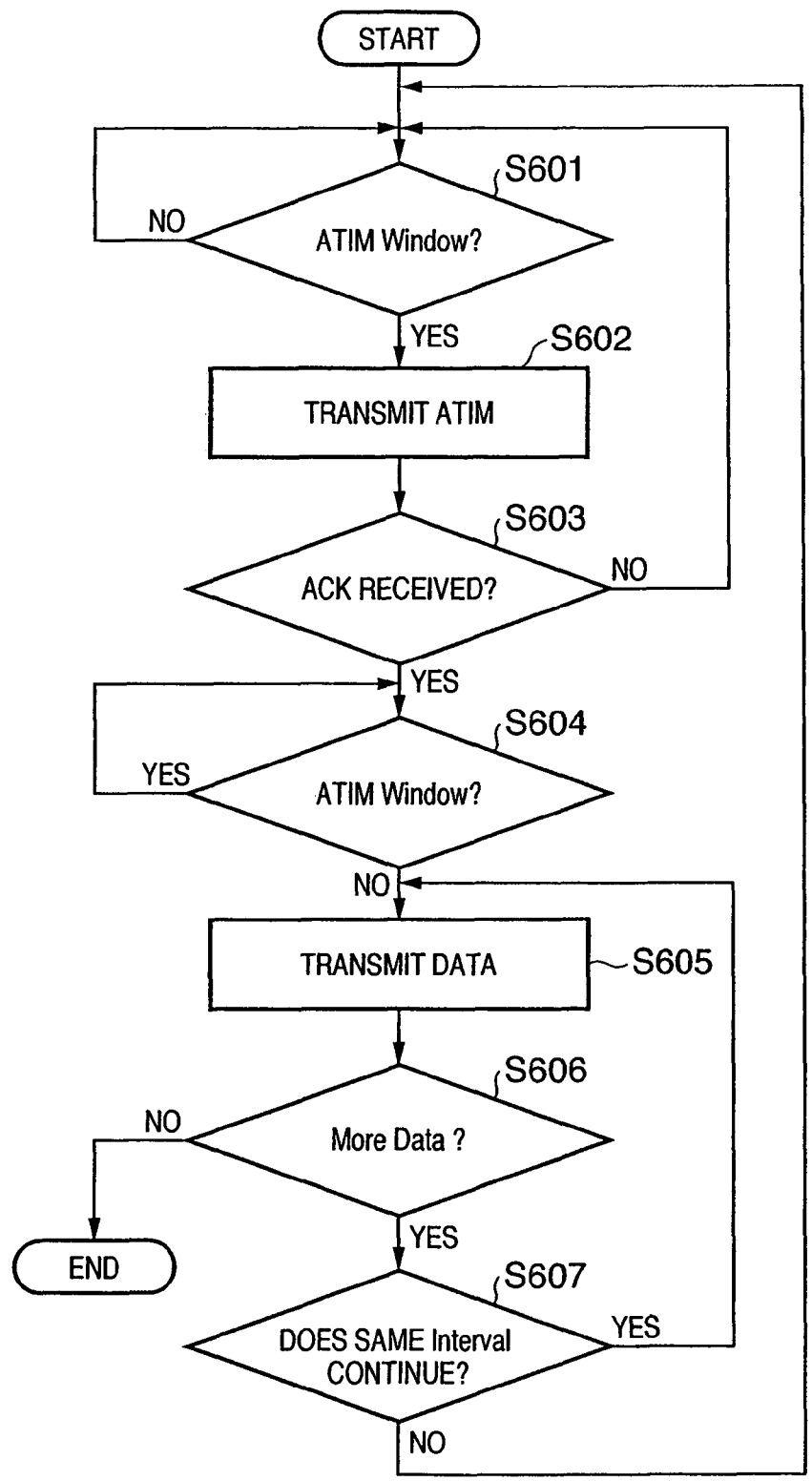
FIG. 6 is a flowchart showing a data transmission sequence according to the first and second embodiments of the present invention.

In this example, the printer 102 also executes the same operation as that in FIG. 6 in data transfer.

As described above, both the camera 101 and printer 102 do not detect the power save states of the partners, and the implementation becomes easy. No PS state detection difference is generated between the camera 101 and printer 102, and no packet loss occurs. A notification of a change in PS state need not be intentionally broadcast by an ATIM, data packet, or the like other than a beacon. Thus, shift of a partner terminal to the Awake state upon reception of the broadcast in a period other than an ATIM Window can be prevented, which is also effective for reduction in power consumption.

(Second Embodiment)

A network configuration in the second embodiment is the same as that in the first embodiment, and is shown in FIG. 1. In FIG. 1, reference numeral 101 denotes a camera; and 102, a printer. The internal configurations of the camera 101 and printer 102 are the same as those in FIGS. 2 and 3, and a description thereof will be omitted.

Figure 12:
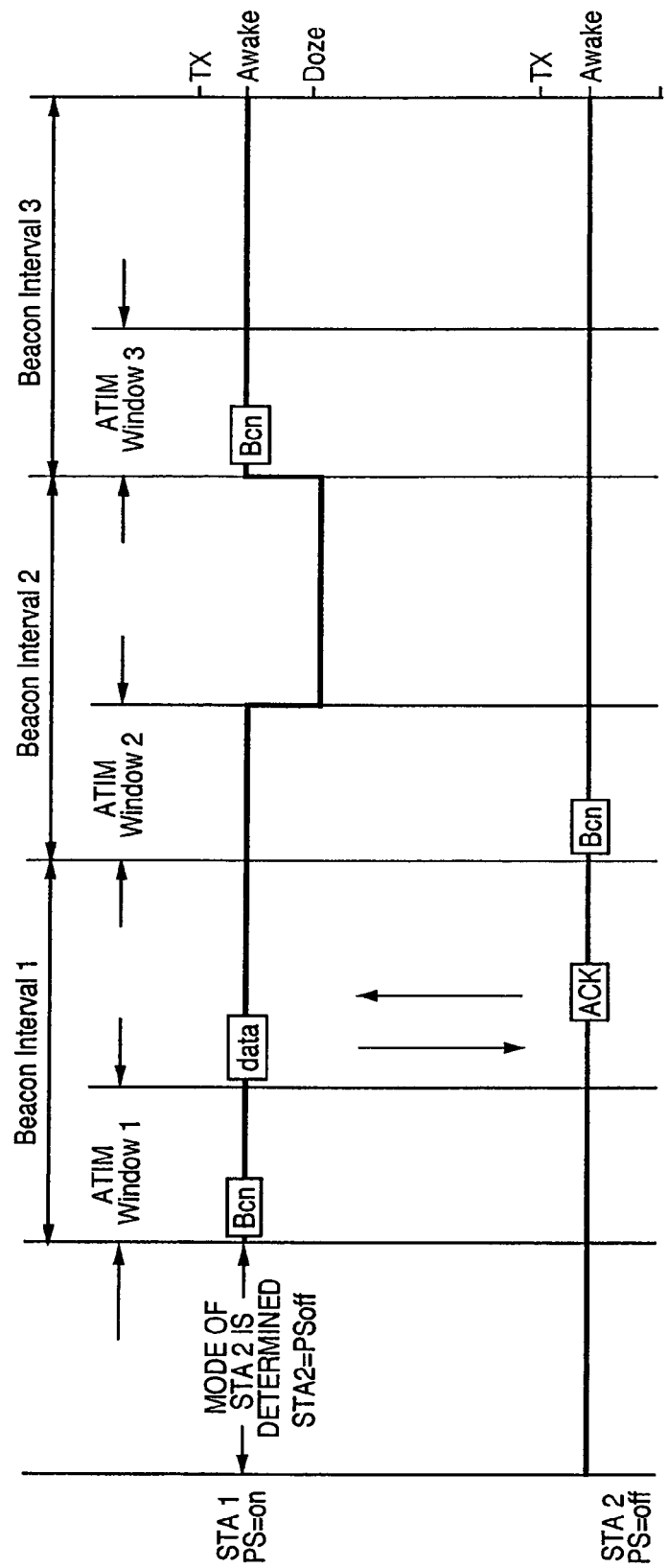
FIG. 12 is a chart showing an example of data transmission when the PS mode of a partner is OFF according to the prior art.
Figure 13:
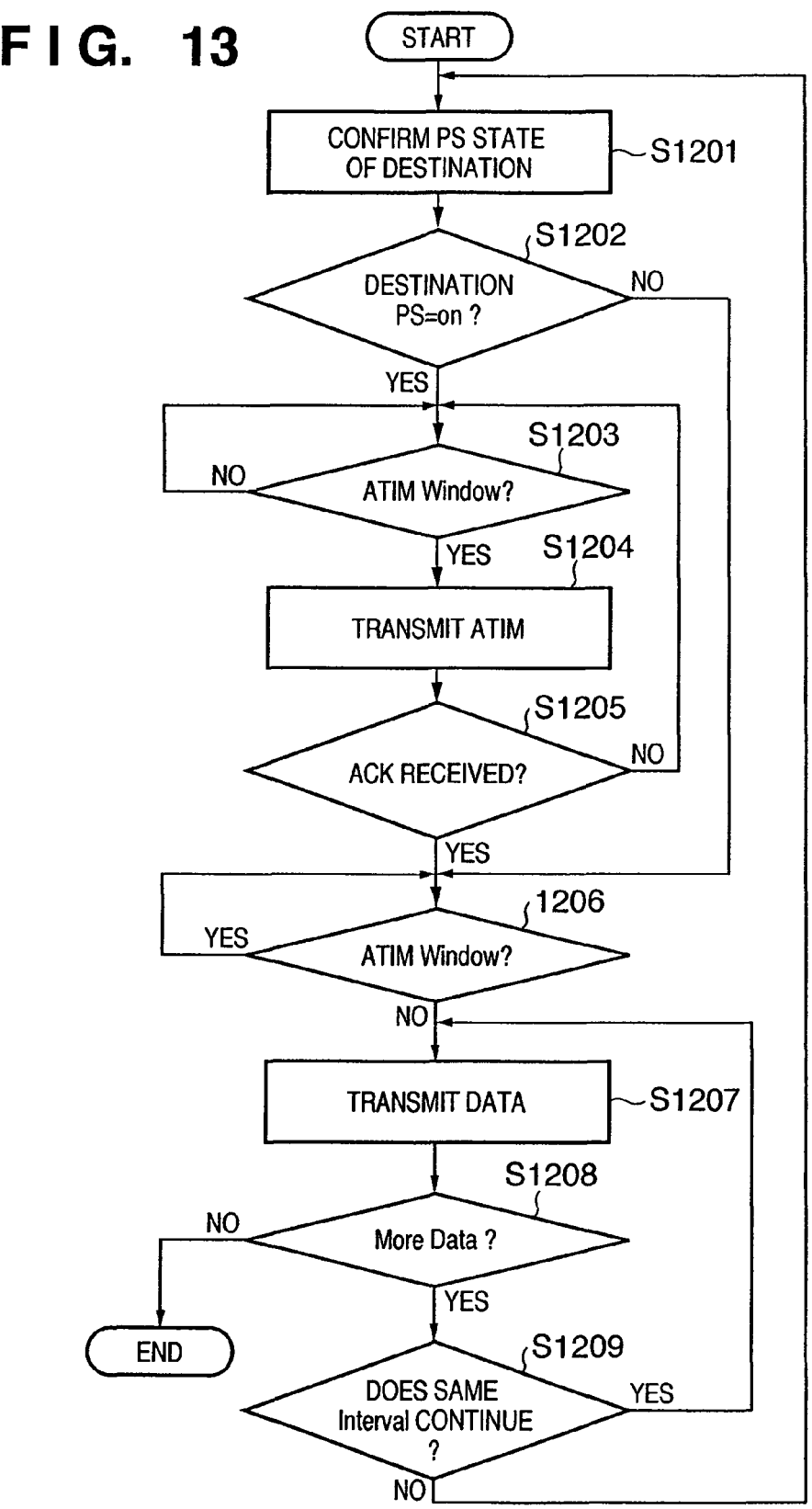
FIG. 13 is a flowchart showing a data packet transmission sequence according to the prior art.

In the second embodiment, the camera 101 does not manage the power save state of a partner, and transmits data in accordance with the sequence of FIG. 6. The printer 102 manages the power save state of a partner, and transmits data in accordance with the sequence of FIG. 12.

Figure 7A:
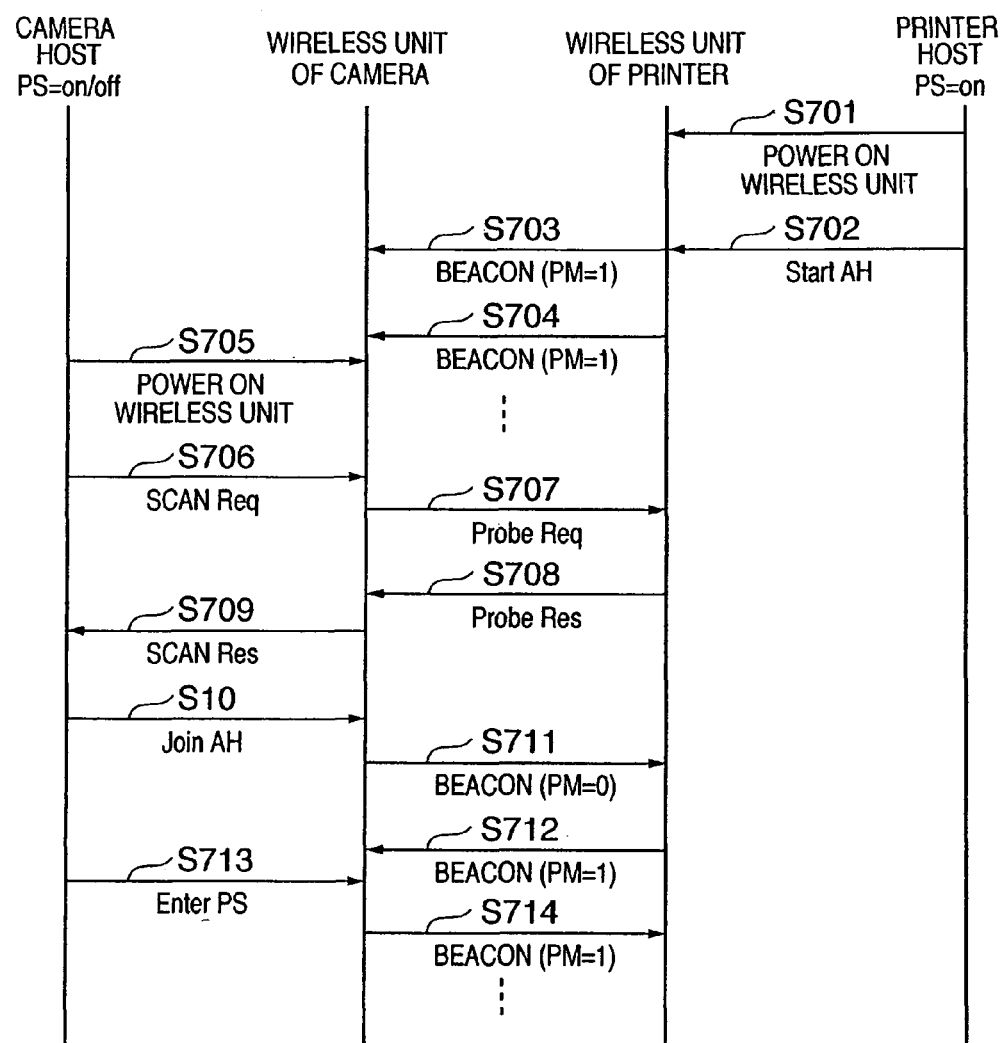
FIGS. 7A and 7B are charts showing a data transmission sequence according to the second embodiment of the present invention.
Figure 7B:
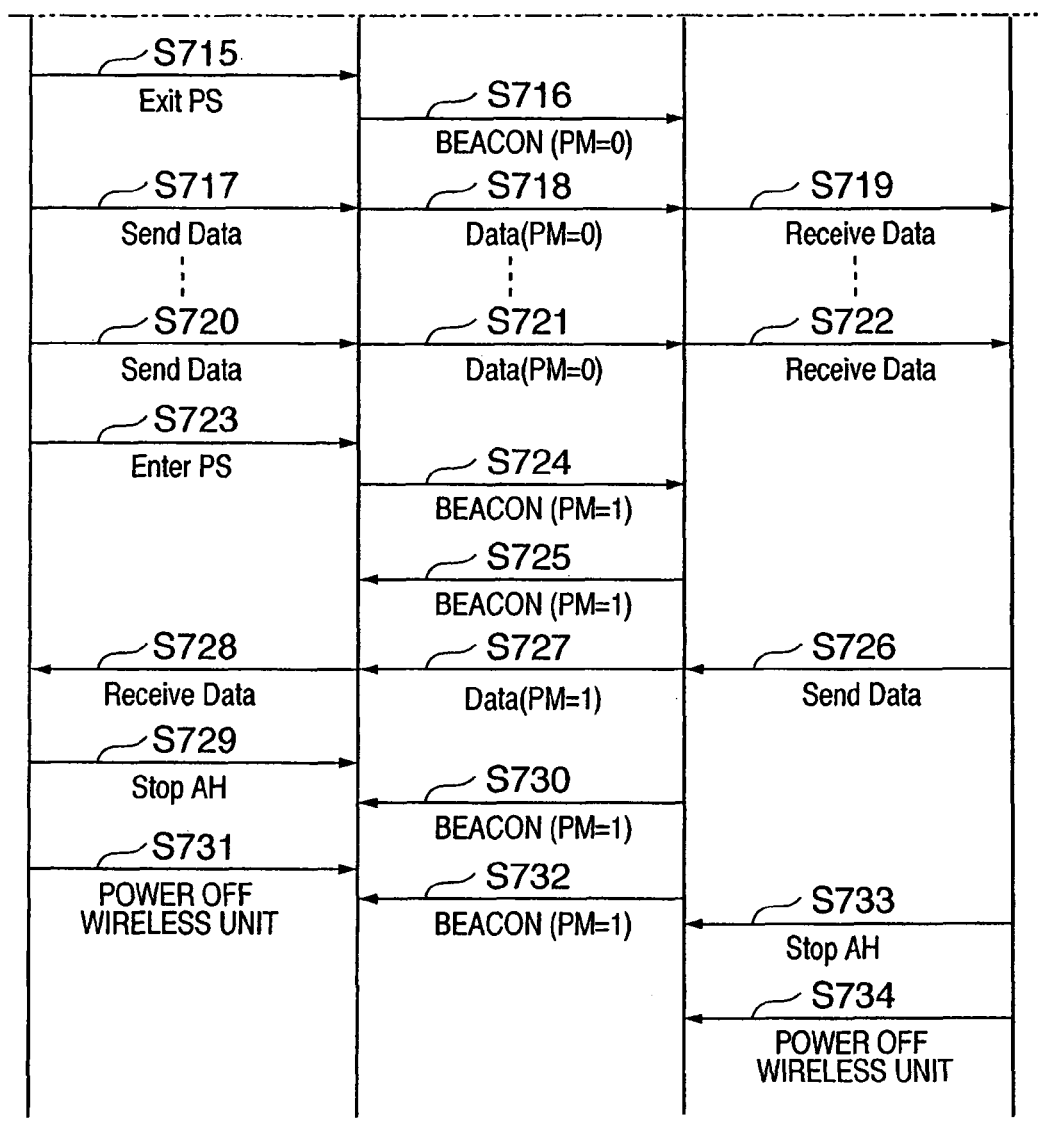

The sequence of wireless operation in printing will be explained with reference to FIGS. 7A and 7B. Operation of the printer from power-on to power-off and operation of the camera from the start to end of printing will be described.

When the user presses the power button of an operation unit 304 of the printer 102, a host CPU 301 is activated by a program saved in a memory 302.

Figure 4:
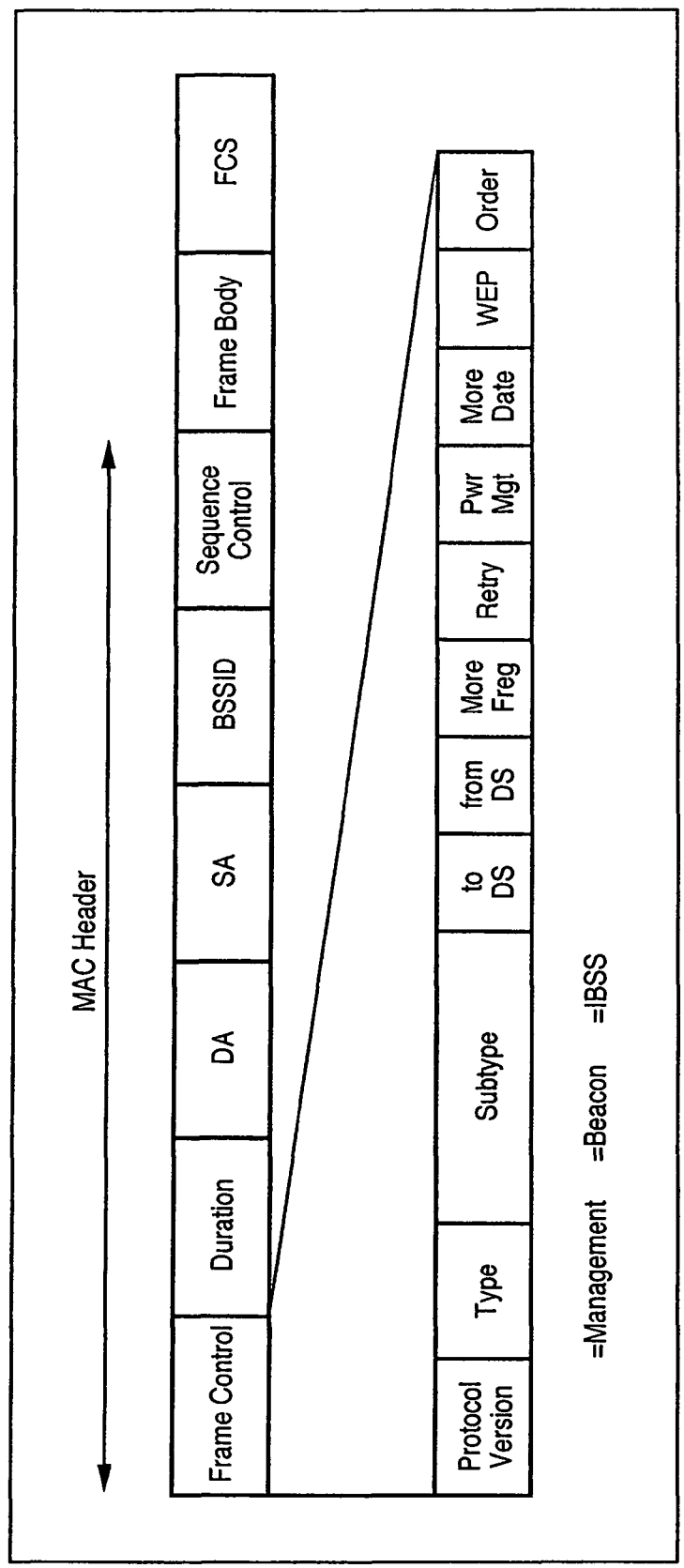
FIG. 4 is a view showing the format of a MAC header for explaining the present invention and prior art.

Upon activation, the CPU 301 activates a wireless unit 305 (S701). After the wireless unit 305 is activated, the host CPU 301 issues a Start Ad Hoc Network command to the wireless unit 305 in the power save mode (S702). Responses to issued commands are sent back, but a description thereof except some responses will be omitted for convenience. The wireless unit 305 receives the command, and starts transmitting an adhoc beacon via an antenna 306 (S703). The wireless unit 305 activates a network in the power save mode at ATIM Window=5 ms and PM=1. The MAC header of the adhoc beacon has the format shown in FIG. 4. At this time, only the printer 102 configures the adhoc network, and transmits a beacon every 100-ms beacon interval (S704).

When the user presses the print button of an operation unit 204 of the camera 101, a host CPU 201 starts communication operation in accordance with a program saved in a memory 202.

The host CPU 201 activates a wireless unit 205 (S705). After the wireless unit 205 is activated, the host CPU 201 issues a scan request command to the wireless unit 205 (S706). The wireless unit 205 receives the scan request command, and transmits a probe request via an antenna 206 (S707).

The wireless unit 305 of the printer 102 receives the probe request via the antenna 306 (S707), and transmits a probe response via the antenna 306 (S708).

Upon reception of the probe response, the wireless unit 205 notifies the host CPU 201 of information (MAC address, SSID, and the like) on the printer 102 which has responded (S709). The host CPU 201 issues a join adhoc command to the wireless unit 205 in order to start communication with the printer 102 on the basis of the notified information (S710).

Upon reception of the join adhoc command, the wireless unit 205 starts transmitting a beacon at the start timing in the ATIM Window (S711). The wireless unit 205 joins the network in the active mode, and the PM bit in the MAC header of the transmitted beacon is 0. Upon reception of the beacon, the wireless unit 305 newly creates and holds the MAC address and PS state bit "0" of the printer 102 in the internal management table of the wireless unit.

At this time, the two stations join the adhoc network, and the printer 102 and camera 101 alternately transmit beacons in respective 100-ms intervals. Hence, the printer transmits a beacon 100 ms after the beacon in S711 (S712). Alternate transmission of beacons continues, unless otherwise specified, and the interval between beacons transmitted from the respective stations is 200 ms.

Immediately after the host CPU 201 of the camera joins the adhoc network, the host CPU shifts to the power save mode and issues an EnterPS command to the wireless unit 205 (S713). Upon reception of the PS command, the wireless unit 205 changes the PM bit to "1" and transmits it in the next beacon transmission (S714). Upon reception of the beacon, the wireless unit 305 reflects the change in state on PM=1 together with the MAC address of the camera which has already been held.

Prior to the start of file transfer, the host CPU 201 of the camera issues an ExitPS command to the wireless unit 205 in order to cancel the power save state of the wireless unit 205 (S715). The wireless unit 205 changes the PM bit to "0" and transmits it at next beacon transmission timing (S716).

Upon reception of the beacon, the wireless unit 305 reflects the change in state on PM=0 together with the MAC address of the camera which has already been held.

The host CPU 201 starts transferring a large-size file which is formed from a photograph file (S717). Upon reception of the data, the wireless unit 205 transmits a data packet to the printer 102 in accordance with the sequence of FIG. 6 (S718). More specifically, the wireless unit 205 performs ATIM transmission and ACK reception every beacon interval before transmitting a data packet to the wireless unit 305 without determining the power save state of the wireless unit 305, and receives an ACK after data transmission. Upon reception of the data packet, the wireless unit 305 transfers the data to the host CPU 301 (S719). The host CPU 301 stores the received data in the memory 302.

The above-described data transfer is repetitively executed till the end of file transfer, and a sequence thereof will be omitted for descriptive convenience. The wireless unit 205 transmits the final packet of the data received in S720 (S721). The wireless unit 305 transmits the received data packet to the host CPU 301 (S722), and ends file transfer.

After the host CPU 301 receives the final data (S722), the printer 102 converts the received image file into print data in the memory 302, and sequentially transfers the print data to the printing unit 303 to start printing.

At the end of file transfer, the host CPU 201 of the camera issues an EnterPS command to the wireless unit 205 in order to quickly shift to the power save mode (S723). Upon reception of the PS command, the wireless unit 205 changes the PM bit to "1" and transmits it in the next beacon transmission (S724). Upon reception of the beacon, the wireless unit 305 reflects the change in state on PM=1 together with the MAC address of the camera which has already been held.

The wireless unit 305 of the printer continues transmitting beacons alternately with the wireless unit 205 regardless of the change in the power save state of the wireless unit 205 of the camera (S725).

The host CPU 301 of the printer receives printing end information from the printing unit 303 about 1 min after the start of printing, and then transfers a printing end status as data to the wireless unit 305 (S726). Since the wireless unit 305 recognizes that the camera 101 is in the power save state, it transmits an ATIM packet to the wireless unit 205 in the ATIM Window to change the wireless unit 205 to the Awake state, and transmits data containing the printing end status as a data packet to the wireless unit 205 (S727). The wireless unit 205 transfers the received data to the host CPU 201 (S728).

The host CPU 201 of the camera 101 analyzes the contents of the data received in S728. Since the contents represent the printing end status, the host CPU 201 determines that printing of the image file transmitted in S717 to S720 has ended, and executes wireless disconnection operation. The host CPU 201 issues a stop adhoc command to the wireless unit 205 (S729).

Upon reception of the stop adhoc command, the wireless unit 205 stops beacon transmission. Since beacon transmission from the wireless unit 205 stops, the wireless unit 305 transmits a beacon every beacon interval of 100 ms (S730). Since the beacon reception status changes and no beacon is received from the camera 101, the wireless unit 305 invalidates the information "PM=1" and the MAC address of the camera which has already been held. The host CPU 201 of the camera then powers off the wireless unit 205 (S731), ending the printing sequence.

The printer 102 singly continues transmitting a beacon (S73). When the host CPU 301 of the printer detects that no data is transmitted/received for 5 min, it issues a stop adhoc command to the wireless unit 305 (S733). Upon reception of the command, the wireless unit 305 stops beacon transmission. The host CPU 301 powers off the wireless unit 305 (S734), and powers off the main body of the printer 102, ending the printing sequence.

As described above, according to the second embodiment, interconnection can be maintained because a camera notifies a connected printer of the power save state of the camera even in connection to the printer having a conventional function as described in

BACKGROUND ART

Further, the camera does not detect the power save state of the printer, and the implementation becomes easy. Even when the PS state of the printer changes, no detection timing difference is generated, and no loss of a packet transmitted by the camera occurs.

(Third Embodiment)

A network configuration in the third embodiment is the same as that in the first embodiment, and is shown in FIG. 1. In FIG. 1, reference numeral 101 denotes a camera; and 102, a printer. The internal configurations of the camera 101 and printer 102 are the same as those in FIGS. 2 and 3, and a description thereof will be omitted.

In the third embodiment, the camera 101 does not manage the power save state of a partner, and transmits data in accordance with the sequence of FIG. 6. When the power save state of the camera 101 changes, the camera 101 transmits an ATIM and dummy data to explicitly notify the partner of the power save state. The printer 102 manages the power save state of a partner, and transmits data in accordance with the sequence of FIG. 12.

Figure 8:
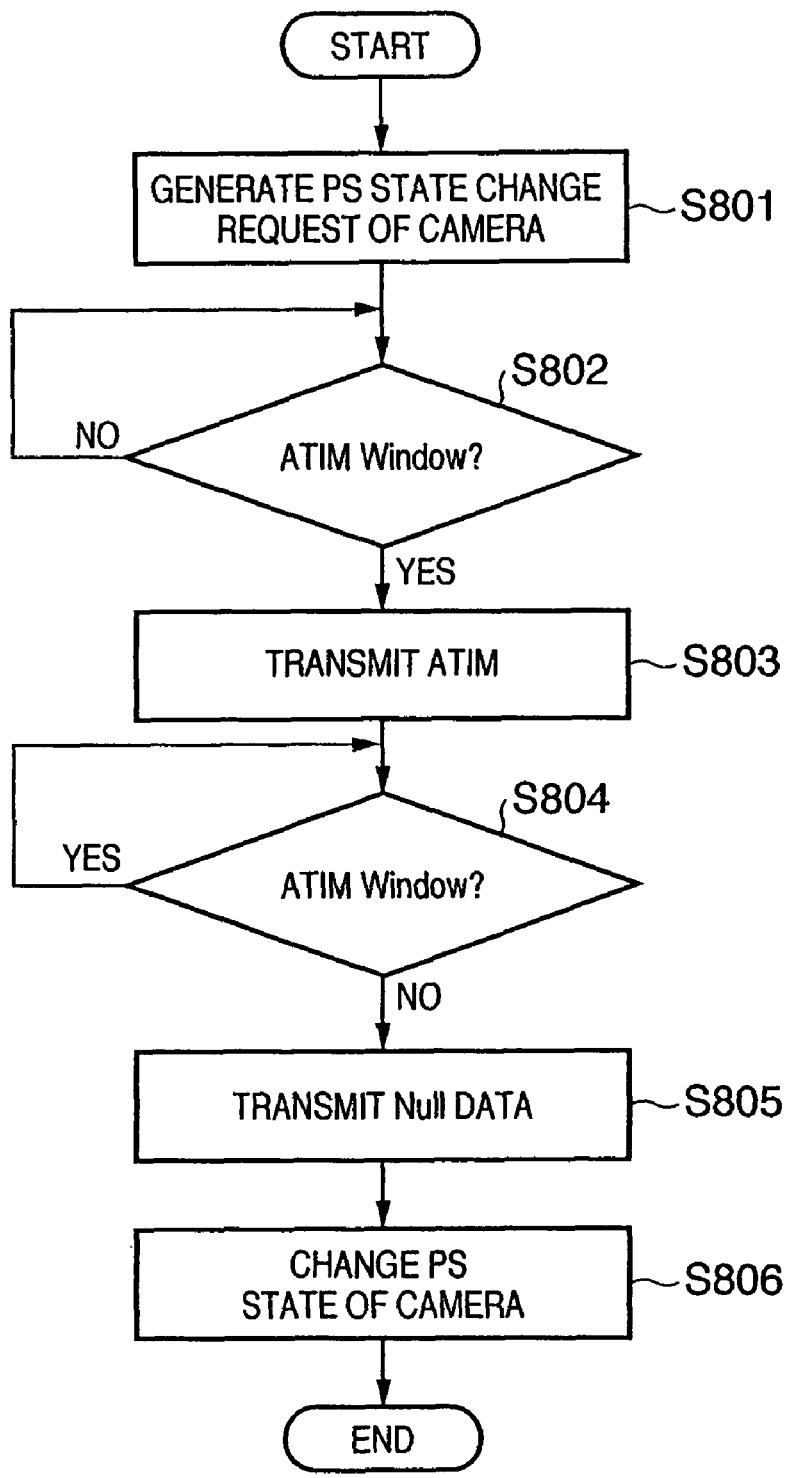
FIG. 8 is a flowchart showing a data transmission sequence according to the third embodiment of the present invention.

When the camera 101 explicitly transmits its power save state, it explicitly notifies the partner of the power save state of the camera 101 by transmitting an ATIM packet and dummy data packet regardless of the power save state of the partner. The flow of PS state notification by the camera 101 will be explained with reference to FIG. 8. The description of the flow assumes that the camera 101 and printer 102 have already configured an adhoc network.

A host CPU 201 of the camera generates a power save state change request such as an EnterPS command or ExitPS command to a wireless unit 205 (S801). The EnterPS command will be exemplified. Upon reception of the PS state change request, the wireless unit 205 determines whether the camera is in the ATIM Window (S802). The flow waits for the ATIM Window timing, and then an ATIM packet having PS=1 in the MAC header is transmitted by a broadcast receivable by all terminals in the adhoc network (S803). By the broadcast, all terminals (in this case, only the printer 102) in the adhoc network keep the Awake state till the next beacon reception. In the broadcast, no ACK reception is done. After ATIM transmission, the flow waits for the end of the ATIM Window period (S804). Then, the PS in the MAC header is changed to "1", and a null data packet containing no data in the data field is broadcasted (S805). Since all terminals (in this case, only the printer 102) in the adhoc network keep Awake, they receive the null data.

After null data is transmitted, the wireless unit 205 of the camera changes the PS state of the camera (S806), and starts intermittent reception.

In the above description, null data can also be omitted to transmit only an ATIM packet before a change in state. When only a specific terminal in a network is notified of a change in state, not a broadcast packet but an ATIM packet and null data may be transmitted to a specific MAC address. Further, in an ATIM Window in which a terminal transmits a beacon, the terminal may notify other terminals of a change in PS state by only a beacon without transmitting any ATIM or null packet.

Figure 9:
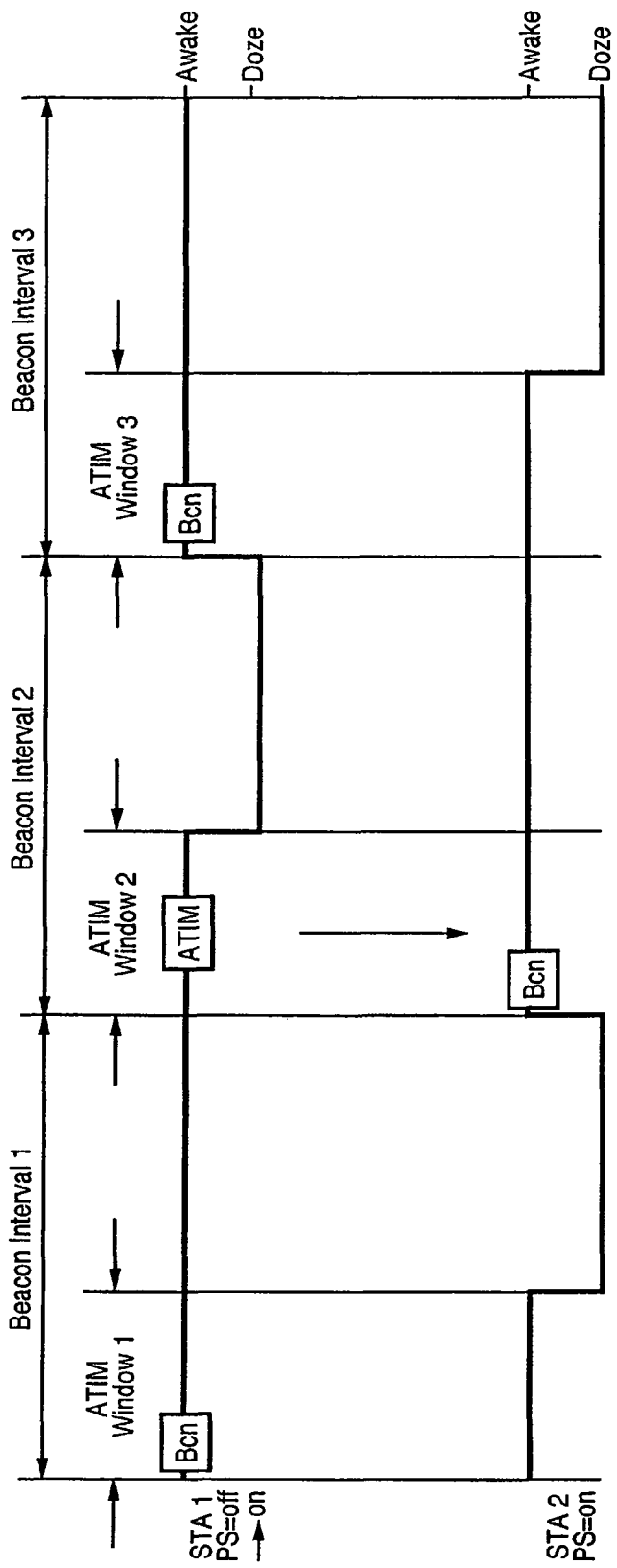
FIG. 9 is a chart showing transmission of only an ATIM according to the third embodiment of the present invention.

FIG. 9 shows a case wherein STA 1 notifies STA 2 of a PS change by only an ATIM packet. Assume that a PS state change request is generated in ATIM Window 2. The camera 101 transmits an ATIM packet in ATIM Window 2 before changing to PS=on, and the PS state is changed to PS=on in the next beacon interval 3 subsequent to the interval in which the packet has been transmitted. STA 1 keeps Awake in beacon interval 3 in order to transmit a beacon, and can shift to the Doze level in beacon interval 4 (not shown).

As described above, an ATIM and null data are transmitted before the power save state is changed, and then the PS state is changed. With this operation, terminals in an adhoc network can be reliably notified of a change in state without detecting the PS state of a partner. Also, a time lag between the PS state notifying side and the PS state detecting side can be prevented, thus preventing generation of any packet loss.

As has been described above, according to the above embodiments, the load of detecting and managing the power save state of a partner on a transmitting station can be reduced, and the implementation becomes easy. Since no difference in update timing is generated between the power save state notifying side and the power save state detecting side, and a packet loss (data reception error) by an update timing difference can be reduced. Compatibility with a conventional terminal can be ensured, and connectivity can be improved by explicitly transmitting an ATIM, null data, and the like.

As many apparently widely different embodiments of the present invention can be made without departing from the spirit and scope thereof, it is to be understood that the invention is not limited to the specific embodiments thereof except as defined in the appended claims.

Claim Of Priority

This application claims priority from Japanese Patent Application No. 2004-273133 filed on Sep. 21, 2004, the entire contents of which are hereby incorporated by reference herein.

The invention claimed is:

1. A communication apparatus, which directly communicates with partner communication apparatuses in a network without using a base station, comprising:
a determination unit constructed to determine a predetermined period during which a reception process is performed regardless of whether or not any of the communication apparatuses in the network is in a power save state, wherein the power save state is a state being within a period where data is not received after the predetermined period determined by the determination unit;
a cancel unit constructed to transmit control information for canceling the power save state of a partner communication apparatus which is in the power save state; and
a transmission unit constructed to transmit data,
wherein before the transmission unit transmits data to the partner communication apparatus, the cancel unit is constructed to transmit the control information, during the predetermined period determined by the determination unit, wherein the control information is transmitted even if the partner apparatus is not in the power save state.

2. The apparatus according to claim 1, wherein said cancel unit transmits said control information in a predetermined period after an annunciation signal is transmitted.

3. The apparatus according to claim 1, wherein the control information includes ATIM (Announcement Traffic Indication Message) defined in IEEE 802.11.

4. The apparatus according to claim 1, further comprising a notification unit adapted to notify change in power save state of the communication apparatus to the partner communication apparatus.

5. The apparatus according to claim 4, wherein said change in the power save state includes a change in state from one of a state in which intermittent reception is performed and a state in which continuous reception is performed to the other.

6. The apparatus according to claim 4, wherein said notification unit transmits information representing the change in the power save state by the control information.

7. The apparatus according to claim 4, wherein said notification unit transmits information representing the change in the power save state after the control information is transmitted.

8. The apparatus according to claim 4, wherein said notification unit broadcasts information representing the change in the power save state.

9. A communication method of a communication apparatus which directly communicates with partner communication apparatuses in a network without using a base station, comprising:
a determination step of determining a predetermined period during which a reception process is performed regardless of whether or not any of the communication apparatuses in the network is in a power save state, wherein the power save state is a state being within a period where data is not received after the predetermined period determined in the determination step;
a cancel step of transmitting control information for canceling the power save state of a partner communication apparatus which is in the power save state; and
a transmission step of transmitting data,
wherein before said data is transmitted to the partner communication apparatus in the transmission step, said cancel step transmits the control information, during the predetermined period determined in the determination step, wherein the control information is transmitted even if the partner apparatus is not in the power save state.

10. A non-transitory computer readable storage medium storing a computer program to cause a computer to execute control on a communication apparatus, which directly communicates with partner communication apparatuses in a network without using a base station, causing the computer to execute:
a determination step of determining a predetermined period during which a reception process is performed regardless of whether or not any of the communication apparatuses in the network is in a power save state, wherein the power save state is a state being within a period where data is not received after the predetermined period determined in the determination step;
a cancel step of transmitting control information for canceling the power save state of a partner communication apparatus which is in the power save state; and
a transmission step of transmitting data, wherein before said data is transmitted to the partner communication apparatus in the transmission step, said cancel step transmits the control information, during the predetermined period determined in the determination step, the control information is transmitted even if the partner apparatus is in the power save state.

* * * * *